United States Patent [19]

Ibaraki et al.

[11] Patent Number: 4,627,861
[45] Date of Patent: Dec. 9, 1986

[54] OIL SEPARATOR

[75] Inventors: Yoshiro Ibaraki, Ibaraki; Toshiaki Kawabata, Tokyo; Tsuneo Kan, Ibaraki; Atsuo Kishi, Katsuta, all of Japan

[73] Assignee: Hitachi, Ltd., Tokyo, Japan

[21] Appl. No.: 599,485

[22] Filed: Apr. 12, 1984

Related U.S. Application Data

[63] Continuation-in-part of Ser. No. 352,378, Feb. 25, 1982.

[30] Foreign Application Priority Data

Mar. 6, 1981 [JP] Japan ................................. 56-31325
Dec. 21, 1981 [JP] Japan ............................... 56-205347

[51] Int. Cl.⁴ ..................... B01D 45/02; B01D 45/06; B01D 50/00
[52] U.S. Cl. ................................. 55/278; 55/308; 55/318; 55/423; 55/438; 55/446; 55/464; 55/471; 55/473; 418/46
[58] Field of Search ................. 55/278, 308, 401, 423, 55/438, 446, 464, 471, 473, 318; 418/46, 47

[56] References Cited

U.S. PATENT DOCUMENTS

| | | | |
|---|---|---|---|
| 512,681 | 1/1894 | Clute | 55/446 |
| 648,068 | 4/1900 | Cookson | 55/464 X |
| 756,943 | 4/1904 | Duck | 55/446 |
| 773,830 | 11/1904 | Vater | 55/446 X |
| 1,626,557 | 4/1927 | Rolaff | 418/46 X |
| 2,018,074 | 10/1935 | Layte | 55/278 |
| 2,162,550 | 6/1939 | Frankford | 55/464 X |
| 2,349,944 | 5/1944 | Dixon | 55/278 X |
| 2,361,394 | 10/1944 | Freeman et al. | 55/446 |
| 3,195,730 | 7/1965 | Muller | 55/278 X |
| 3,199,273 | 8/1965 | Kudsi | 55/446 X |
| 3,623,828 | 11/1971 | Shapiro | 55/446 X |
| 3,676,024 | 7/1972 | Akaiki et al. | 55/464 X |
| 3,768,236 | 10/1973 | Rudge | 55/438 |

FOREIGN PATENT DOCUMENTS 185936 7/1906 Fed. Rep. of Germany ........ 55/446
349956 12/1960 Switzerland ........................ 55/278

Primary Examiner—Kathleen J. Prunner
Attorney, Agent, or Firm—Antonelli, Terry & Wands

[57] ABSTRACT

An oil separator for separating oil from exhausted gas containing refrigerant gas and fine particles of oil incorporated in the refrigerant gas including grooved plates each formed with a multiplicity of grooves on opposite surfaces to allow the exhausted gas to flow in a direction substantially at right angles to the grooves, whereby the fine particles of oil can be trapped by the grooved plates. The oil separator can achieve increased oil separation efficiency.

6 Claims, 9 Drawing Figures

OIL SEPARATOR

CROSS REFERENCE TO THE RELATED APPLICATION

This is a Continuation-in-Part of U.S. Ser. No. 352,378 filed on Feb. 25, 1982.

BACKGROUND OF THE INVENTION

This invention relates to oil separators, and, more particularly, to an oil separator, mounted in an outlet or discharge section of a gas compressor, for separating the minute particles of oil incorporated in the refrigerant gas.

It has been the usual practice to use oil separators provided with filter means formed of porous materials; however, a disadvantage of the use of a porous filter material resides in the fact that the porous material tends to undergo a degeneration when exposed to an atmosphere of refrigerant and oil at high temperature and pressure over a prolonged period of time, with such exposure not only resulting in a reduction in the performance of the filter means but also in a blocking of the oil feeding passage by decomposed filter material finding its way into the oil feeding system thereby resulting in a compression loss in the compressor.

This invention has as its object the provision of a highly efficient oil separator for separating oil from the exhausted gas containing refrigerant gas and minute particles of oil incorporated in the refrigerant gas exhausted through the outlet port of a compressor.

In accordance with the invention an oil separator is mounted in the outlet section of a gas compressor for separating oil from the exhausted gas containing refrigerant gas and minute particles of oil, and a separating means, comprising at least one grooved plate formed at least on one surface thereof with a plurality of grooves is provided, with the separating means being installed in such a manner that the exhausted gas flows substantially at right angles to the grooves whereby the oil in the refrigerant gas can be trapped by the grooved plates.

DETAILED DESCRIPTION

Figures 1, 5:
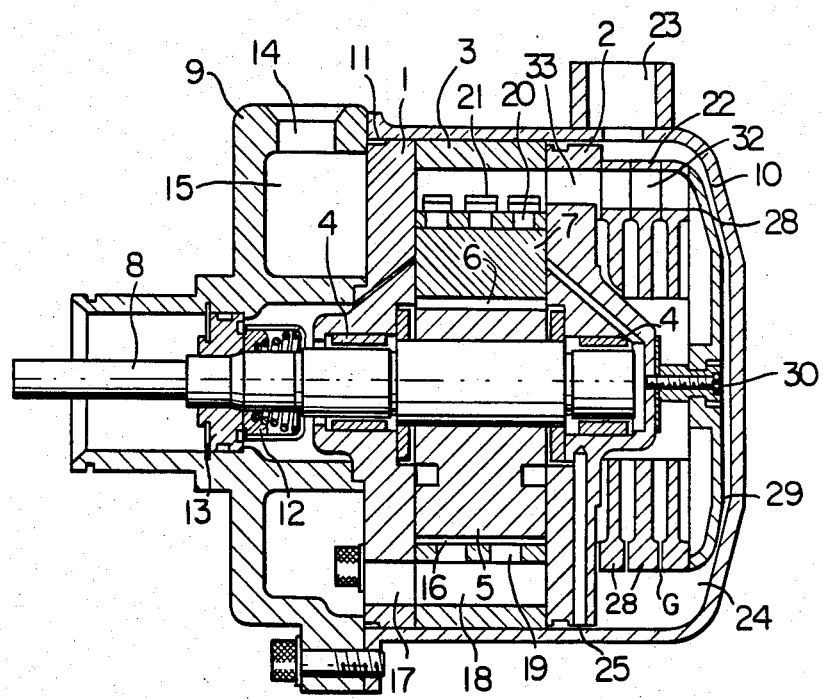
FIG. 1 is a vertical cross sectional view of a vane type gas compressor provided with the oil separator constructed in accordance with one embodiment of the invention.
FIG. 5 is an exploded perspective view of the oil separator of FIG. 4.
Figure 1A:
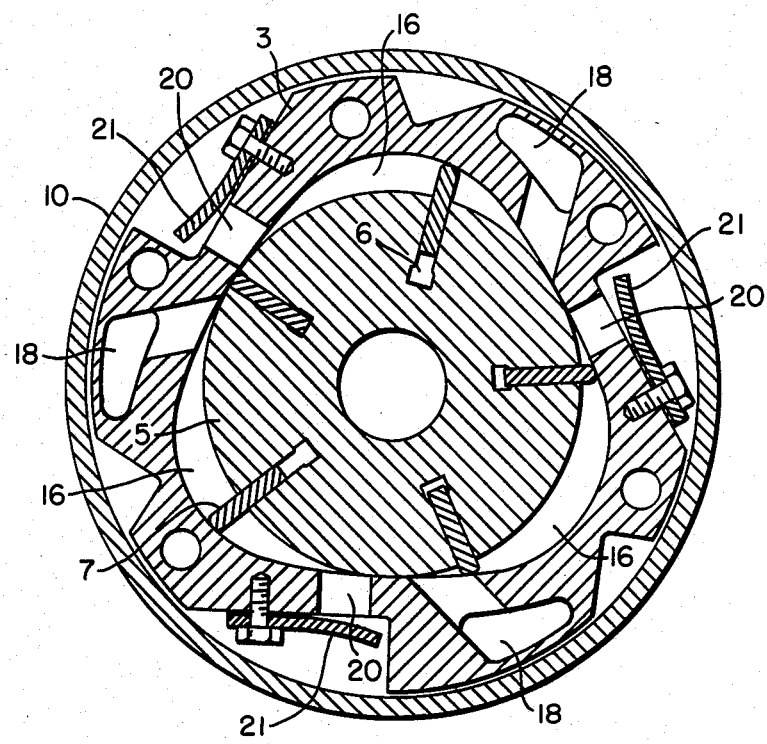
FIG. 1A is a cross-sectional view of the discharge side of the compressor with which the oil separator of our invention is associated.

Referring now to the drawing wherein like reference numerals are used throughout the various views to designate like parts and, more particularly, to FIG. 1, according to this figure, a vane type gas compressor comprises a front plate 1, a rear plate 2 and a cam ring 3 mounted between the two plates 1 and 2 to define a hollow space in which bearings 4 on the front and rear plates 1 and 2 support a rotor 5 for rotation. The rotor 5 includes a plurality of radial grooves 6 formed in the rotor body for slidably receiving vanes 7. A drive shaft 8 is driven from, for example, an engine, not shown, through electromagnetic clutch means, not shown. The front plate 1, rear plate 2 and cam ring 3 are securely connected by, for example bolts, not shown, to a front cover 9, and are accommodated in a chamber 10. The front cover 9 and chamber 10 are sealed air-tight by an O-ring 11, and a rotary member 12, connected to the shaft 8, and a cover plate 13, secured to the front cover 9, constitute shaft sealing means.

In the vane type gas compressor of FIG. 1, the refrigerant gas, containing tiny amounts of oil in minute particles returning from the refrigeration cycle to the compressor, flows through a refrigerant gas suction port 14 formed in the front cover 9 into a low pressure chamber 15 formed in the front cover 9. The refrigerant gas flows into compression chambers 16, defined by the cam ring 3 and rotor 5, through gas ducts 17 formed in the front plate 1 and gas ducts 18 formed in the cam ring 3 of the same number as the compression chambers 16 (two in this embodiment) and suction ports 19 communicating the gas ducts 18 with the compression chambers 16. The refrigerant gas is compressed by the vanes 7 in the rotor 5 and exhausted through exhaust ports 20 and a discharge valve 21 formed in the cam ring 5. The exhausted refrigerant gas contains minute particles of oil and has the oil separated therefrom by an oil separator 22, installed in the chamber 10 before being recycled through a discharge port 23 in the chamber 10, into the refrigeration cycle. Lubrication of the sliding parts, such as the bearings, is effected by oil drawn by suction from an oil sump 24 through oil holes 25 by a pressure differential.

Figure 2:
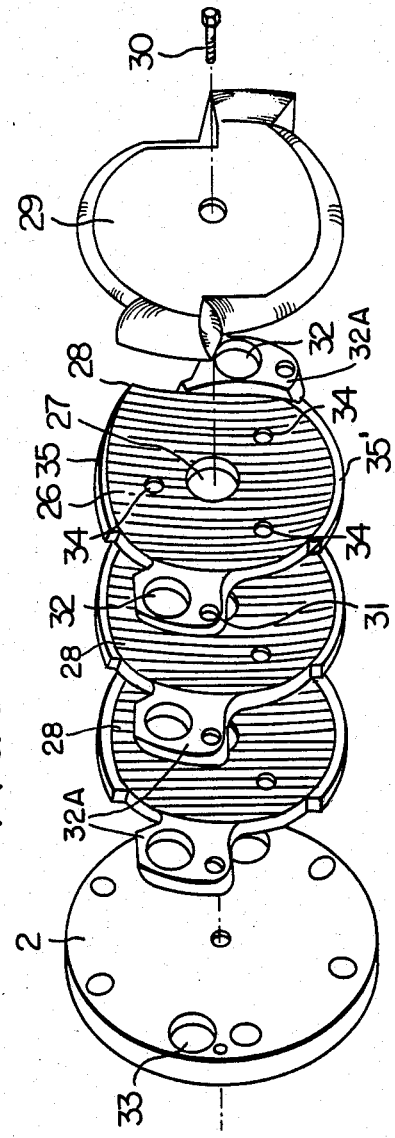
FIG. 2 is an exploded perspective view of the oil separator suitable for use with a compressor including two compression chambers.
Figure 3:
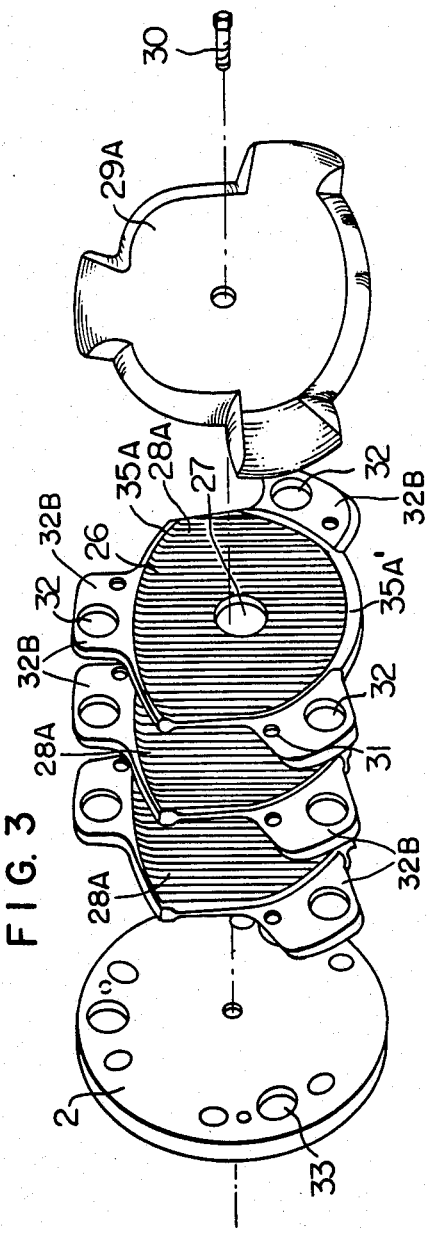
FIG. 3 is an exploded perspective view of an oil separator suitable for use with a compressor including three compression chambers.

As shown in FIGS. 2 and 3, the oil separator 22 comprises separating means composed of grooved plates 28, 28A each having a plurality of grooves 26 formed on opposite surfaces thereof, with gas passages 32 for introducing the exhausted gas into the separator being formed as a unit with the grooved plates. The grooved plates 28, 28A with an opening 27 for the gas to flow therethrough, are arranged in spaced-apart, parallel relationship and have a blind plate 29, 29A attached to one end. The grooved plates 28, 28A and blind plate 29, 29A constitute the separating means which is secured to the rear plate 2 by a screw 30. To avoid rotation of the separating means, the grooved plates 28, 28A are each formed with an aperture 31 for securing the plates 28, 28A to the rear plate 2 by a knock pin, not shown.

The separating means is formed with two gas passages 32 in positions corresponding to those of gas passages 33 formed in the rear plate 2, to introduce the exhausted gas into the separating means.

The grooved plates 28, 28A and blind plate 29, 29a may be formed of material selected from the group consisting of a ferrous alloy, aluminum, and aluminum alloy, copper, a copper alloy, magnesium, a magnesium alloy and plastics, by taking into consideration the wettability with oil droplets, affinity with oil droplets, production method, cost and other factors. In accordance with the invention, the grooved plates 28, 28A are produced by die casting and each are formed at a periphery thereof with partition walls 35, 35', 35A, 35A' extending substantially at right angles to the grooves 26 at the upper and lower ends of both surfaces of the grooved plates 28, 28A.

The surfaces of the upper partition walls 35, 35A and the flat portions 32A, 32B containing the passageways 32 of adjacent grooved plates are in close contact with each other to prevent leakage of the exhausted gas at those surfaces and flat portions. on the surfaces of the grooved plates three projections 34 are provided having the same height as that of the partition walls 35 such that the projections 34 and the partition walls 35 of adjacent grooved plates contact each other As shown in FIG. 1, gaps generally designated by the reference character G are formed between lower partition walls 35' or 35A'. An upward flow of the exhaust gas flowing parallel to the grooves is prevented by the upper partition walls 35, 35A (FIGS. 2 and 3), and the oil trapped on the surfaces of the groove plate falls through the gaps between the lower partition walls into the sump 24 (FIG. 1). The refrigerant gas after the oil is trapped flows into the space between the oil separator 22 and the chamber 10 from gaps between the grooved plates formed on the sides of the grooved plates, the gas flows along the space and is collected in the discharge port 23 and, consequently, the gas is recycled. A small part of the refrigerant gas flows from the gaps of the lower partition walls 35', 35A' together with the falling oil since the gaps are narrow, but the greater part of the gas flows into the space as noted hereinabove. The grooves 26 are shown as being formed on opposite surfaces of the plates 28, 28A, but may be formed only on one surface. Oil separation efficiency is increased when the grooves 26 are formed on the opposite surfaces.

In the oil separator 22 the exhausted gas containing refrigerant gas and minute particles of oil compressed in the compression chambers 16 flow through the gas passages 33 in the rear plate 2 and the gas passages 32 formed as a unit with the grooved plates 28 and changes the direction of its flow upon impinging upon the blind plate 29, 29A. The gas flows through the openings 27 from one grooved plate 28 or 28A to another substantially at right angles to the grooves 26 at high speed, while the exhausted gas flows between the grooved plates 28, 28A the minute particles of oil are trapped by the grooves 26 and grow into oil drops which flow along the grooves 26 into the oil sump 24. Meanwhile, the refrigerant gas freed of the oil flows around the oil separating means to be recycled into the refrigeration cycle through the discharge port 23.

In the embodiment of FIGS. 1 and 2, there are two compression chambers 16, however, as shown in FIG. 3, for a compressor having three compression chambers, the separating means of the oil separator, while constructed and operating on the basis of the same concept as the embodiment of FIGS. 1 and 2 with two compression chambers, has three exhaust gas passages 33 provided in the rear plate 2. Regardless of the number of the exhaust gas passages 33, the flow of the gas takes place in the same fashion.

In the embodiments of FIGS. 1-3, the grooves 26 are oriented substantially in the direction of the gravity. It is to be understood that the same oil separation effects can be achieved even if the grooves 26 cross one another so long as the grooves 26 are directed substantially in the direction of the gravity.

The number of the grooved plates may vary depending on the available space in the chamber. To effectively utilize a small space, the thickness of the grooved plates may be reduced. When this is the case, it is possible to increase the thickness of the grooved plates without reducing separation efficiency by forming a plurality of projections of small thickness on a part of each grooved plate as described hereinabove.

Figure 4:
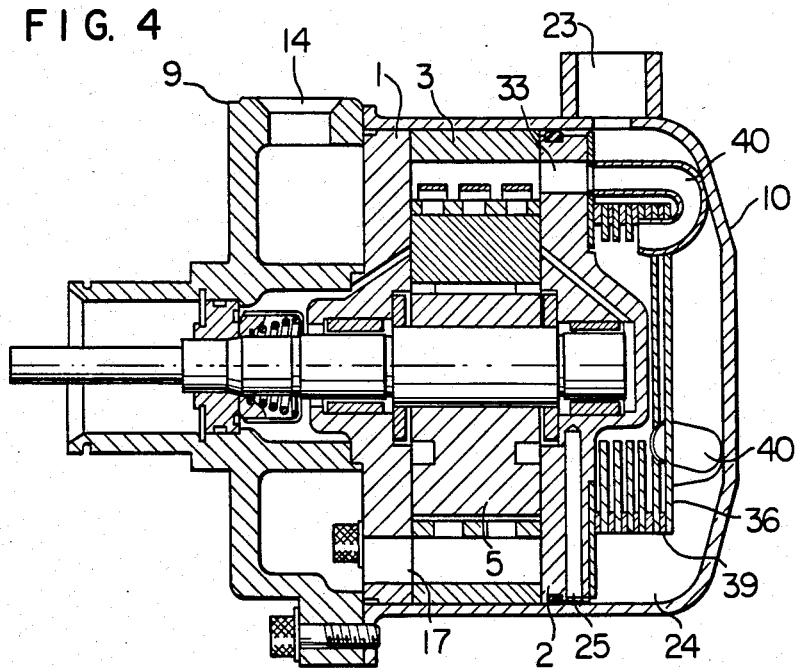
FIG. 4 is a vertical cross sectional view of a vane type gas compressor provided with the oil separator comprising another embodiment of the invention.
Figure 6:
FIG. 6 is a transverse cross sectional view of a separating plate in the oil separator of FIG. 4.

As shown in FIGS. 4-6, the oil separating means of a vane type gas compressor includes grooved plates 36 each of which are formed with a plurality of grooves 37 on opposite surfaces and with an opening 38 substantially in the central portion being provided in some of the grooved plates 36 for the exhausted gas to flow therethrough. The grooved plates 36 are arranged in a parallel relationship with spacers 39 being interposed between the grooved plates 36. The spacers 39 are located in positions in which they extend in a direction at right angles to the grooves 37 in the peripheral portion of each grooved plate 36 (at the lower end and the upper end as shown in FIG. 4). The grooved plates 36 arranged together with the spacers 39 being interposed therebetween constitute separating means. Pipes 40 provide passages for the exhausted gas to connect the gas passages 33 in the rear plate 2 to the openings 38 formed in the grooved plates 36, with the pipes 40, as shown most clearly in FIG. 5, being formed separately from the separating means.

As shown in FIG. 6 the grooves 37 in the grooved plate 36, formed on the opposite surfaces of the plate 36, have a substantially V-shaped cross section.

In the oil separator means of the construction of FIGS. 4-6, the exhausted gas flows from the compressor and the oil in the exhausted gas is trapped by the grooves 37 in the same manner as described in connection with FIG. 1.

In the embodiment of FIGS. 4-6, an expensive mold, necessary for performing die casting, can be dispensed with in producing the grooved plates 36 and, consequently, this embodiment is suitable for producing oil separators in small quantities.

Figure 7:
FIG. 7 is a transverse cross sectional view of a modified separating plate.

As shown in FIG. 7, the oil separator may be formed of grooved plates 36a in which the grooves 37a, formed on opposite surfaces, are substantially U-shaped in cross section.

Figure 8:
FIG. 8 is a transverse cross sectional view of still another modified separating plate.

It is also possible, as shown in FIG. 8 for a grooved plate 36b to be provided by bending a thin sheet.

From the foregoing description, it will be appreciated that the oil separator according to the invention is capable of greatly increasing the efficiency with which oil is separated from gas and enables a compact size to be obtained in an oil separator.

Oil separators of the prior art have raised a problem with regard to noise and vibration generated in the chamber. The oil separator according to the invention has reduced noise and vibration levels because the channel for the exhausted gas to flow and the shape of the grooved plates contribute to reduced pressure and speed fluctuations. Also lack of porous material is conducive to increased reliability in performance.

What is claimed is:

1. An oil separator installed in a compressed gas discharge section of a gas compressor to separate oil from exhausted gas containing refrigerant gas and minute particles of oil in the refrigerant gas, the oil separator comprising:

a plurality of grooved plates each formed with a plurality of grooves on opposite surfaces thereof and with openings serving as passageways for the exhausted gas, a blind plate and upper and lower partition wall portions on each plate, said grooved plates being arranged in juxtaposed, spaced apart, parallel relationship, said blind plate being disposed at one end of the plurality of grooved plates, said exhausted gas passageways of each grooved plate being sealingly aligned with passageways of adjacent grooved plates to introduce the exhausted gas therethrough toward said blind plate, said grooves are arranged so as to extend in a substantially vertical direction, said blind plate is disposed outwardly of the grooved plate most remote from the compressor discharge section, said blind plate cooperating with the grooved plates so that the exhausted gas introduced through the gas passageways impinges on the blind plate and changes direction, said gas passageways are formed in peripheral portions of each of said grooved plates, at least one additional opening is provided in each of the grooved plates in a central area so that the exhausted gas flows through the spaces between adjacent grooved plates substantially at right angles to the grooves, said upper and lower partition wall portions prevent the exhausted gas from flowing parallel to the grooves in the grooved plates, said partition wall portions being substantially at right angles to said grooves, the grooved plates closely contact each other at the upper partition wall portions and have a gap between the lower partition wall portions, whereby the oil can be trapped by the grooved plates and flow along the grooves by gravity through the gap between lower partition wall portions.

2. An oil separator as claimed in claim 1, wherein said exhausted gas passageways form a sealed unit with said grooved plates.

3. An oil separator as claimed in claim 2, wherein said grooves have a V-shaped cross-section.

4. An oil separator as claimed in claim 2, wherein said grooves are substantially U-shaped in cross section.

5. An oil separator as claimed in claim 1, wherein said grooves have a substantially V-shaped cross section.

6. An oil separator as claimed in claim 1, wherein said grooves have a substantially U-shaped cross-sectional configuration.

* * * * *